(12) United States Patent
Hoggarth

(10) Patent No.: US 6,654,004 B2
(45) Date of Patent: *Nov. 25, 2003

(54) CONTROL POST OR JOYSTICK ELECTROMECHANICALLY ENGAGING A KEYPAD-CENTERED POINTER DEVICE FOR A LAPTOP COMPUTER OR THE LIKE

(75) Inventor: Roger Philip Hoggarth, Ayrshire (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/253,151

(22) Filed: Feb. 19, 1999

(65) Prior Publication Data

US 2002/0057257 A1 May 16, 2002

(30) Foreign Application Priority Data

Mar. 6, 1998 (GB) .............................................. 9804676

(51) Int. Cl.⁷ ............................. G09G 5/08; A63F 13/00
(52) U.S. Cl. ......................... 345/161; 345/157; 463/38
(58) Field of Search ................................ 345/156–158, 345/161–168; 463/38

(56) References Cited

U.S. PATENT DOCUMENTS

| 5,034,574 | A | * | 7/1991 | Martovitz | 345/161 |
|---|---|---|---|---|---|
| 5,278,557 | A | | 1/1994 | Stokes et al. | 341/34 |
| 5,343,219 | A | * | 8/1994 | DuBosque, Jr. | 345/160 |
| 5,489,900 | A | * | 2/1996 | Cali et al. | 131/119 |
| 5,521,596 | A | * | 5/1996 | Selker et al. | 341/22 |
| 5,615,083 | A | * | 3/1997 | Burnett | 345/161 |
| 5,640,179 | A | * | 6/1997 | Lake | 345/161 |
| 5,694,123 | A | * | 12/1997 | Selker et al. | 345/161 |
| 5,699,082 | A | * | 12/1997 | Marks et al. | 345/157 |
| 5,867,808 | A | * | 2/1999 | Selker et al. | 702/41 |
| 5,870,082 | A | * | 2/1999 | Selker et al. | 345/168 |
| 5,889,508 | A | * | 3/1999 | Slotta | 345/161 |
| 5,949,643 | A | * | 9/1999 | Batio | 345/168 |
| 5,982,355 | A | * | 11/1999 | Jaeger et al. | 345/161 |
| 5,982,356 | A | * | 11/1999 | Akiyama | 345/161 |
| 6,002,388 | A | * | 12/1999 | Seffernick et al. | 345/161 |
| 6,310,606 | B1 | * | 10/2001 | Armstrong | 345/161 |

FOREIGN PATENT DOCUMENTS

| EP | 0 725 329 | 8/1996 |
|---|---|---|
| EP | 0 751 455 | 1/1997 |

* cited by examiner

Primary Examiner—Regina Liang
Assistant Examiner—Duc Q Dinh
(74) Attorney, Agent, or Firm—Marc D. McSwain; R. Bruce Brodie

(57) ABSTRACT

In a laptop computer having a display, a matrix of touch-sensitive keys, and a TrackPoint® device for generating cursor and function selection on display is embedded centrally among the keys. The TrackPoint® has a removable cap into which the joystick can be mechanically and electrically coupled. This permits stable platform joystick operation, especially where the computer executes programs involving a joystick as an element of a simulated control interface.

4 Claims, 3 Drawing Sheets

CONTROL POST OR JOYSTICK ELECTROMECHANICALLY ENGAGING A KEYPAD-CENTERED POINTER DEVICE FOR A LAPTOP COMPUTER OR THE LIKE

FIELD OF THE INVENTION

This invention relates to manually actuable control surfaces, posts, and other devices, and more particularly to said control surfaces, posts, and other devices electromechanically engaging computer-driven displays for regulating cursor movement and function selection on said displays.

DESCRIPTION OF RELATED ART

Aspects of Laptops

A "laptop" is defined as a microcomputer small enough to use on one's lap. Laptops may be plugged into an electrical outlet or more conveniently powered by an internal battery for several hours. Laptops are also referred to as "portable" or "notebook" computers. The terms "portable", "notebook", and "laptop" will be used synonymously throughout the specification.

The term "notebook" derives from the fact that laptop computers may be closed and carried much like a closed book when not in use. In addition, they may be opened up, as is a book, when being read. When so open, the display occupies the top lid or cover portion and is approximately vertical and hinged to the bottom lid or cover portion. Relatedly, the latter contains information entry and processing facilities, and is electrically and logically coupled to a liquid crystal display (LCD). An LCD is an information display comprising a picture element (pixel) addressable array. Because of the LCD's thin sandwich construction, the bulk associated with electron beam tube displays can be eliminated.

A laptop includes a random access memory (RAM), a CPU responsive to instructions stored in RAM for functional execution of programs, an LCD display and driver, a disk-based storage subsystem including a CD-ROM drive and a large capacity magnetic disk drive for staging and destaging programs and data from the CD-ROM to and from a magnetic disk drive and RAM. It further includes an arbitrated bus distribution network for providing asynchronous communication pathways among the laptop elements and permitting the CPU to exercise direct and indirect control over all laptop elements.

Laptops also feature dedicated ports such as a telephone communications port, a mouse port, a parallel device (printer) port, a serial device port, and a game port. Since laptops are expected to execute multimedia displays, sound cards and other peripherals are provided which can be either integrated into the laptop or provided as stand-alone units connected to the laptop via a port.

Display Pointer and Function Selection Devices

A mouse is a manually operable small mobile device that controls the movements of a cursor and the selection of function on a computer display. Originally, a mouse used cyclically operable elements for electromechanically generating a mapped computer display of the position and motion of a cursor. This was implemented by imparting relative motion to a ball or wheel past sensors. These sensors generated indicia representing kinematic activity of the mouse, which was then mapped into position, and motion of the cursor in a multidimensional display space and medium.

The advent of games executable on computers, especially those involving aircraft flight and piloting simulation, has substantially increased demand for quasirealistic control interfaces. A "joystick" is the name of a manually grippable post used in aircraft pilotage to alter aircraft kinematics. The joystick is manually gripped at one end and concurrently moved in several degrees of freedom to alter the aircraft kinematics. In this regard, kinematics is that branch of dynamics that deals with aspects of motion apart from considerations of mass and force (geometry of motion). In aircraft, the joystick is coupled to the aircraft control surfaces either directly by control lines or hydraulic actuators, or indirectly through a computer controlled fly-by-wire arrangement. Joysticks as implemented in combat fighter aircraft are usually embellished with additional control features associated with weapon loading and firing.

Prior Art Joysticks and Laptop Computers

In the prior art, several references are believed pertinent. These include Burnett, U.S. Pat. No. 5,615,083, "Detachable Joystick for a Portable Computer", issued Mar. 25, 1997; Stokes et al., U.S. Pat. No. 5,278,557, "Cursor Movement Control Key and Electronic Computer Keyboard for Computers Having a Video Display", issued Jan. 11, 1994; Sellers, EP 0 725 329, "Collapsible Pointing Stick Apparatus for a Portable Computer", published Aug. 7, 1996; and Agata, EP 0 751 455, "A Portable Computer and a Keyboard Therefore", published Jan. 2, 1997.

Burnett discloses a joystick, a mounting bracket, and collar coupling the joystick electrically and mechanically to a game port, the port being embedded within a palm-rest portion adjacent to a keyboard of a laptop computer. Stokes discloses a force-sensitive key driving an array of force-sensitive resistors operably engaging said resistors and generating electrical indicia for use in a video display. Sellers describes a collapsible pointing stick structure mounted on the top side of a keyboard that is manually pivotable. Agata discloses the use of a pointing device that can be elevated and lowered consistent with the raising of the cover of a laptop or notebook computer.

SUMMARY OF THE INVENTION

It is accordingly an object of this invention to devise a seamless mechanically and electrically integrated joystick as a manually operable control element for use with contemporary laptop computer information entry/keyboard interfaces.

It is a related object that such seamless integration provides a stable mechanical operating environment for the ordinary and usual joystick actuations when executing aircraft flight or pilotage simulation programs on a laptop computer.

The foregoing objects are believed satisfied by a system comprising a display, a keyboard, and a processor coupling the display and keyboard. The keyboard includes a matrix of actuable touch-sensitive keys or the like and a manually operable device such as a modified TrackPoint® sited among and within predetermined ones of the keys. The TrackPoint® device couples the processor for controlling movement of a display cursor and the selection of function as depicted on the display. The system further comprises a manually grippable lever (joystick) with a post at one of the lever ends, a mechanism coupling the post end of the lever to the device for forming a unitary control, and circuits responsive to kinematics of the coupled lever and device for communicating indicia thereof to the processing arrangement. The coupled lever and device are concurrently movable in several degrees of freedom. TrackPoint® is a trademark of the IBM Corporation.

A TrackPoint® device includes a post having a lower portion connected to a force transducer, and an upper portion adapted for engagement with a removable cap which is manipulated by the user to cause a pointer to move on the display of the laptop. The joystick of the present invention includes at its lower end a post adapted to be positioned into the upper portion of the TrackPoint® device post when the end cap is removed.

In a preferred embodiment, the electrical connection between the joystick and the laptop computer includes electrical contact on the joystick post, which is electrically connected to at least one user-actuatable button on the joystick. The joystick electrical contacts are adapted to engage with corresponding electrical contacts in the upper portion of the TrackPoint® device post, wherein actuation of the button causes a signal to be relayed via the joystick post for processing by logic in the laptop computer.

As an alternative, a cable could be provided on the joystick for connection to a port of the laptop computer. This would allow the joystick to be used with a laptop computer which did not provide electrical contacts in or on the pointing device post. In a preferred computer system, the joystick further includes a sprung shaft for converting movement of the joystick into movement of the force transducer. Alternative arrangements could be used in order to transfer the movement of the joystick to the force transducer of the pointing device.

Advantageously, the joystick is both removably mounted and sited at a point of maximum stability. As the joystick is progressively rotated in several degrees of freedom, associated angular torques are generously and equiangularly resisted by the entire keyboard footprint due to the central location within the keyboard of the joystick mounting site.

DESCRIPTION OF THE PREFERRED EMBODIMENT

Figure 1:
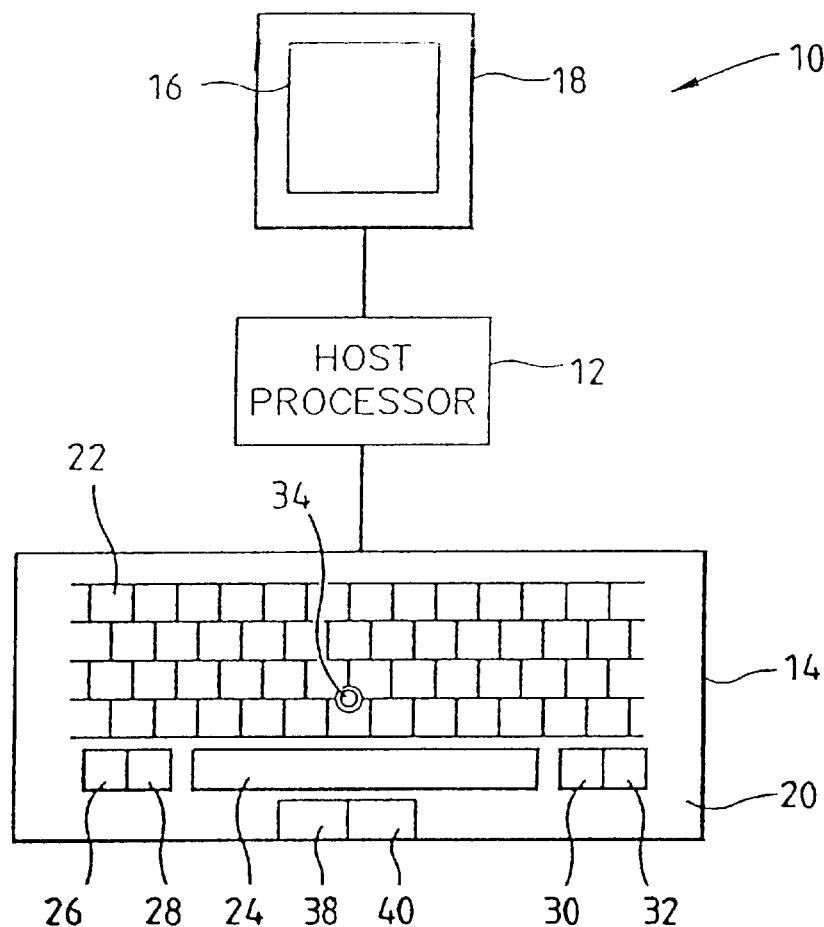
FIG. 1 is a schematic representation of a prior art computer system having an integrated pointing device and click buttons.

Referring now to FIG. 1, there is shown a computer system 10 which comprises a host processor 12 that receives manual control inputs from an attached keyboard unit 14 and displays system responses on a display screen 16 of a display device 18. The keyboard unit includes a surrounding rectangular frame 20 that supports a plurality of manually depressible keys 22. The keys include the normal 26 keys bearing the letters of the alphabet, which are arranged in the conventional QWERTY layout. The keys also include conventional F1 through F12 function keys, and other keys such as CAPS LOCK, SHIFT, TAB, and so forth.

The keyboard unit has a small, substantially rigid, pointing device of the type known as a "TrackPoint®" device commonly sold with ThinkPad® laptop systems sold by IBM Corporation.

Figure 2:
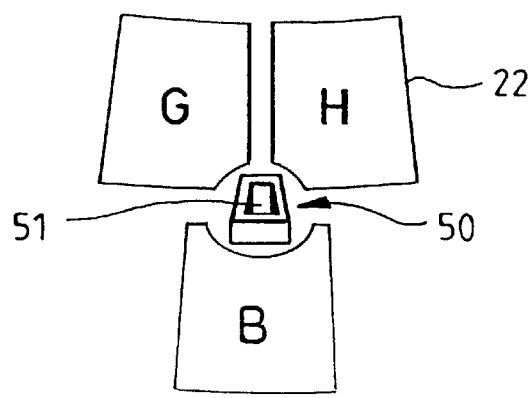
FIG. 2 shows an enlarged schematic view of a portion of the integrated pointing device of FIG. 1.
Figure 4:
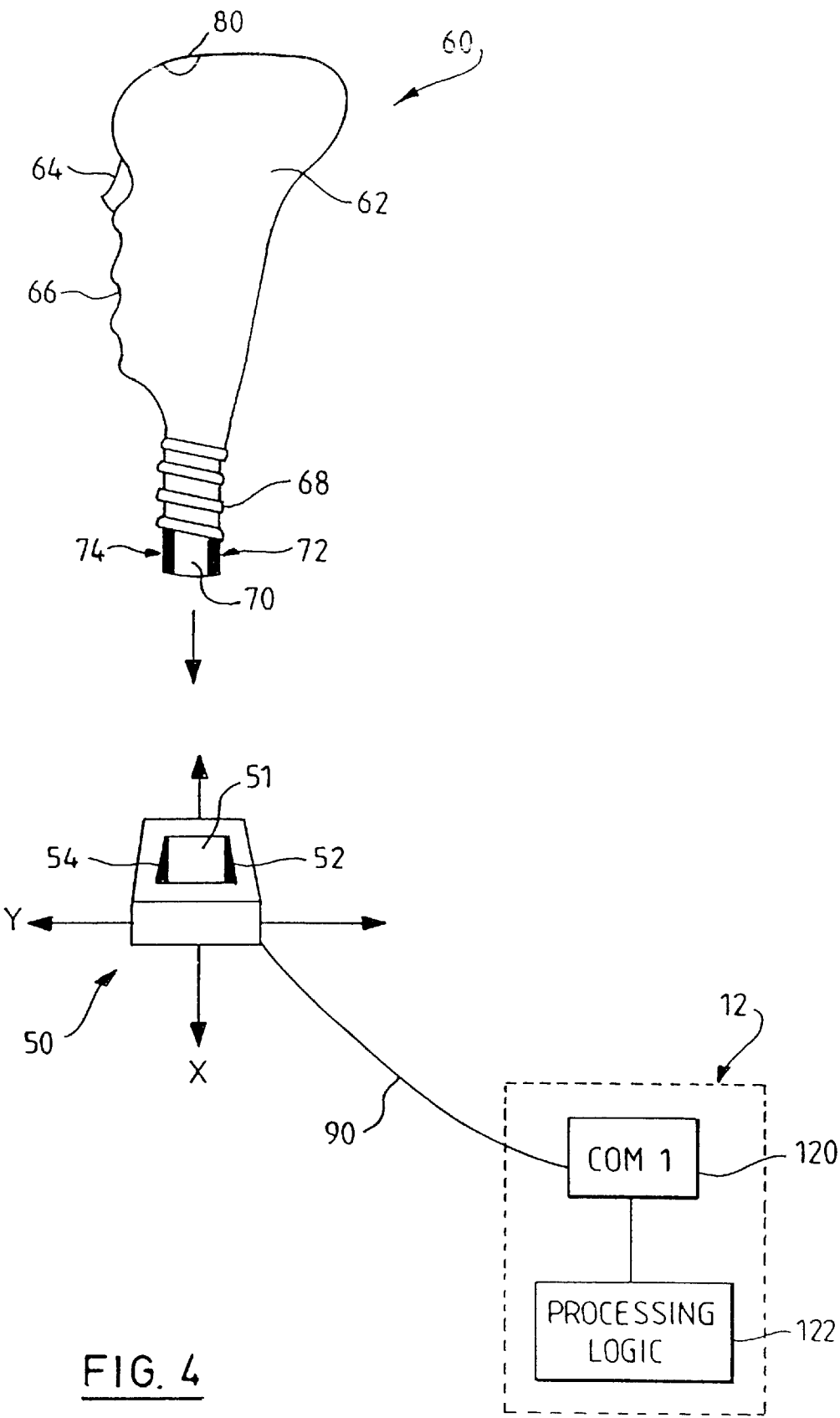
FIG. 4 is a schematic representation of the side view of a joystick according to a preferred embodiment of the present invention, including the logical interface to the laptop computer.

Referring now to FIG. 2, the pointing device is embedded in the keyboard unit between the G, H, and B keys and can be engaged by the tip of the user's index finger and lateral forces over a 360-degree range in the general horizontal plane of the keyboard unit in order to move an active pointer across the display screen. The pointing device comprises a small vertical post 50 with an elastomeric cap (not shown) on its upper end. In FIG. 2, the vertical post of the pointing device is shown with the cap removed. The lower end of the post is rigidly secured to a force transducer (indicated by arrows X and Y in FIG. 4) which may take the form of a thin film resistive strain gauge as described in the EPO application EP A 663648. The movement of the force transducer is translated into signals representing movement in the Y and X direction as indicated in FIG. 4. These signals are provided to processing logic in the laptop computer in a manner known in the art.

The keyboard unit further includes a pair of click button assemblies 38 and 40 mounted in side-by-side relationship in the wrist support portion of the frame 20. The click button assemblies serve the same function as the click buttons on the conventional mouse widely used in personal computers.

Figure 3:
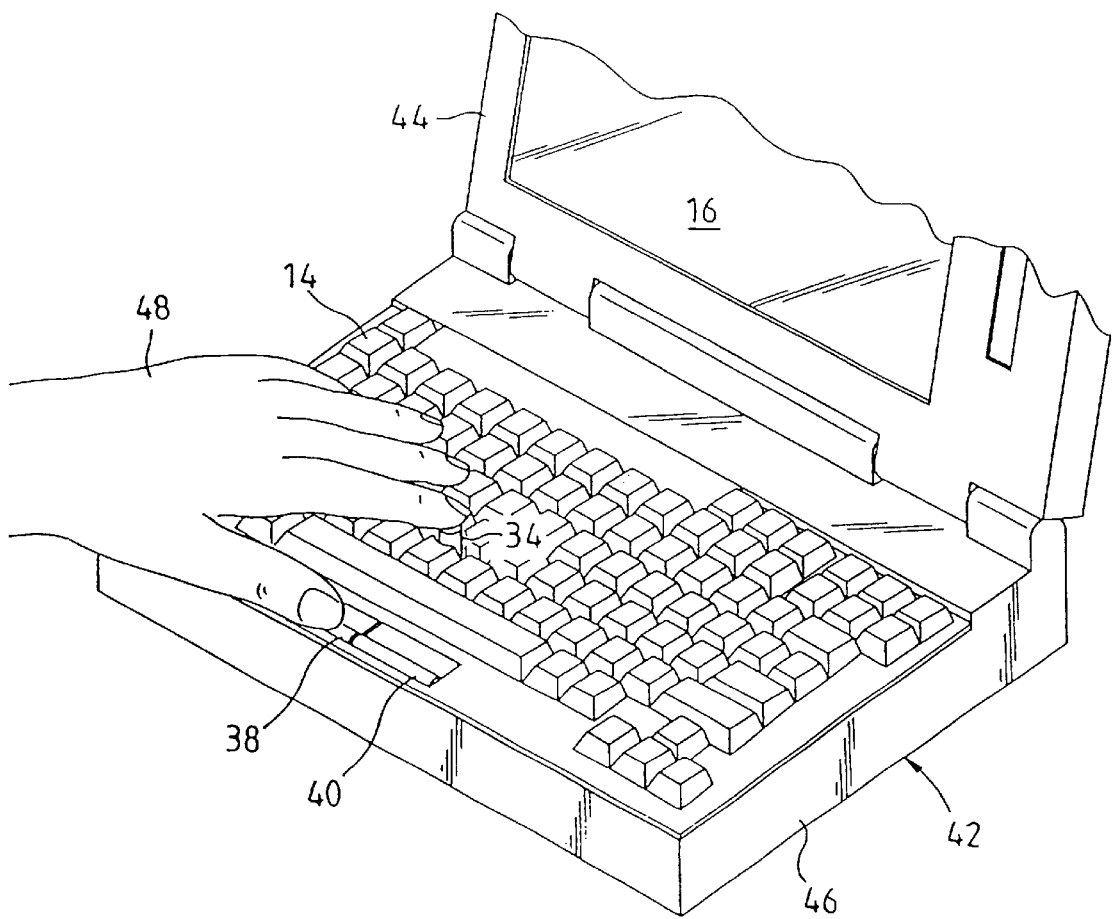
FIG. 3 illustrates a perspective view of a prior art laptop computer having a keyboard including an integrated pointing device such as a TrackPoint®.

Referring now to FIG. 3, there is shown a laptop computer 42 equipped with the keyboard unit 14 and incorporating the display screen 16. The display screen is carried on the inside of a lid 44, which is hingedly attached to the base 46 of the laptop computer. The lid can be closed to conceal the keyboard unit. In FIG. 3, the index finger and thumb of a user's left hand 48 are shown in engagement with the pointing device 34 and the click button assembly 38, respectively.

Referring now to FIG. 4, there is shown a schematic representation of the side view of a joystick according to a preferred embodiment of the present invention. The joystick 60 comprises a main body 62 including a trigger 64 located at the front side above an operator grip portion 66. As on conventional game joysticks, this trigger is operated by the user in order, for example, to fire at objects moving on the display screen. Extending downward from the main body is a sprung shaft 68 which terminates in an end portion 70 which is dimensioned to mount in the internal cavity 51 of the vertical post 50 of the pointing device. Located front and back on the end portion are sprung electrical contacts 72, 74 which are designed to engage with corresponding electrical contacts 52, 54 (e.g., copper) located within the vertical post.

It will be appreciated that although in the present embodiment the vertical post includes a cavity into which the joystick is mounted, in an alternative arrangement the vertical post could comprise a stub including electrical contacts on its outer surface which are designed to engage with electrical contacts on the inner surfaces of a mounting portion of the joystick. In this latter arrangement, the mounting portion would need to be dimensioned to avoid fouling the operation of adjacent keys on the keyboard.

The sprung shaft of the joystick is designed to translate the motion of the operator's hand into input to the force transducer of the pointing device and hence into signals provided to the laptop computer. The stiffness of the spring is chosen to provide ease of use, with differing stiffnesses changing the joystick performance relative to the amount of movement performed by the operator.

As shown in FIG. 4, the contacts of the vertical post are connected via wiring 90 to the COM1 serial port 120 of laptop computer host processor 12. The trigger is arranged so that when pressed, it closes the electrical circuit between the contacts on the end portion of the joystick, thereby causing a signal to be relayed to the COM1 port and thence to processing logic 122 in the laptop computer. Appropriate wiring to COM1 would therefore allow the depression of the trigger to be the equivalent of depressing one of the buttons of the click button assembly. As an alternative to connecting the wiring to the COM1 port, the contacts of the vertical post could be wired either to the mouse port or to the click button assembly.

If desired, additional user-actuatable buttons can be provided on the joystick to provide additional functionality for the user. One such button is indicated at 80 in FIG. 4. Although not shown, additional electrical contacts would be provided on the joystick end portion and the vertical post in order to relay a signal to COM1 of the laptop computer when the additional button is pressed. Such an additional button would preferably replicate the action of a second button of the click button assembly.

In the foregoing description, joystick capability is provided for a laptop computer with the need only to add electrical contacts in the pointing device and additional electrical wiring between the integrated pointing device and processing logic of the computer. In the case where the laptop computer does not include such contacts and additional wiring, the joystick would include an attachable cable for connection to either the mouse or COM1 port of the laptop computer. This arrangement would allow use of the invention with an unmodified laptop computer. Alternatively, the joystick cable could terminate in a PC card designed to be insertable into a PC card slot in the laptop computer. In this latter arrangement, gaming or other software could also be provided on the PC card.

While the invention has been described with respect to an illustrative embodiment thereof, it will be understood that various changes may be made in the method and means herein described without departing from the scope and teaching of the invention. Accordingly, the described embodiment is to be considered exemplary and the invention is not to be limited except as specified in the attached claims.

What is claimed is:

1. A system comprising a display, a keyboard, and a processor coupling said display and said keyboard, said keyboard including a matrix of actuable touch sensitive keys and a manually operable pointing device sited among and within predetermined ones of said keys, said pointing device coupling to said processor for controlling the movement of a display cursor and the selection of function as depicted on the display, said system further comprising:

a manually grippable lever including a post attached at one end;

a mechanism coupling said post end of said lever to the pointing device for forming a unitary control structure, said coupled lever and pointing device being concurrently movable in several degree of freedom; and circuits responsive to kinematics of the coupled lever and pointing device for communicating indicia thereof to the processor;

wherein the pointing device comprises a pointing device post having a lower portion connected to said force transducer and an upper portion adapted for engagement with a removable-user end cap, the lever including, at its lower end, a post adapted to connect to the upper portion of the pointing device post when the cap is removed.

2. The system according to claim 1, wherein the circuits include electrical contacts on the lever post coupled to at least one user-actuable button on the lever, the lever electrical contacts being adapted to engage with corresponding electrical contacts in the upper portion of the pointing device post, wherein actuation of the button causes a signal to be relayed via the lever post and circuits to the processor.

3. In combination with a joystick and a laptop computer, said computer comprising a display, a keyboard, and a processor coupling said display and keyboard, said keyboard including a matrix of actuable touch-sensitive keys and a manually operable pointing device sited among and within predetermined ones of said keys, said pointing device coupling to said processor for controlling movement of a display cursor and a selection of function as depicted on the display, wherein:

the pointing device comprises a first post having a lower portion connected to a force transducer and an upper portion adapted for engagement with a removable user-engageable end cap; and the joystick comprises, at its lower end, a second post adapted to connect to the upper portion of the first post of the pointing device upon removal of the end cap.

4. The combination according to claim 3, wherein said joystick includes at least one finger actuable control element mounted thereon; and further wherein the pointing device includes circuits coupling the control element and is responsive to its actuated state for communicating indicia thereof to the processor.

* * * * *